July 28, 1959　　　M. E. PETERSEN　　　2,896,338
SATELLITE GLOBE
Filed April 8, 1958
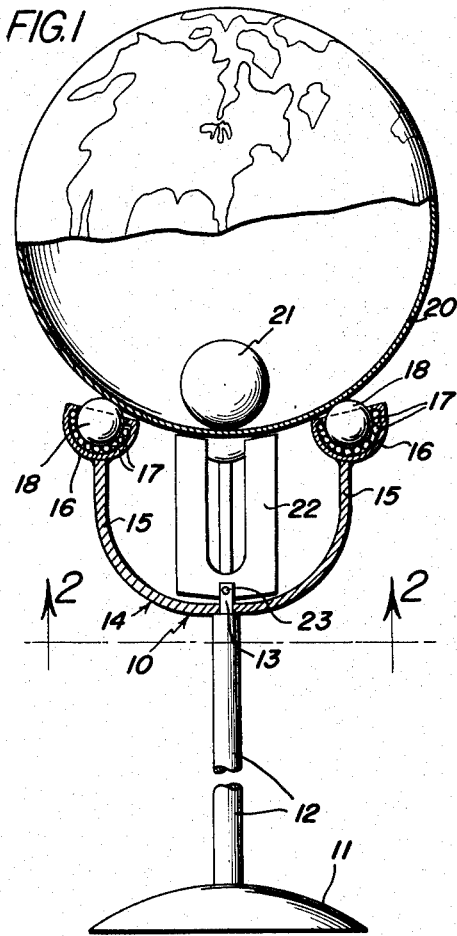
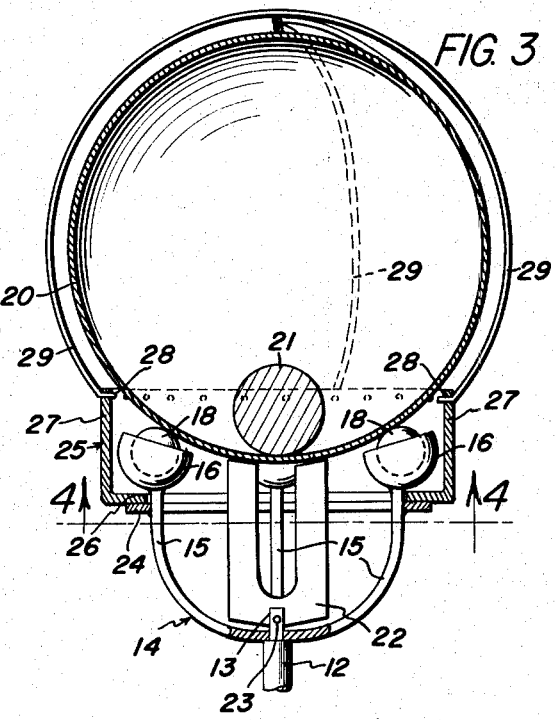
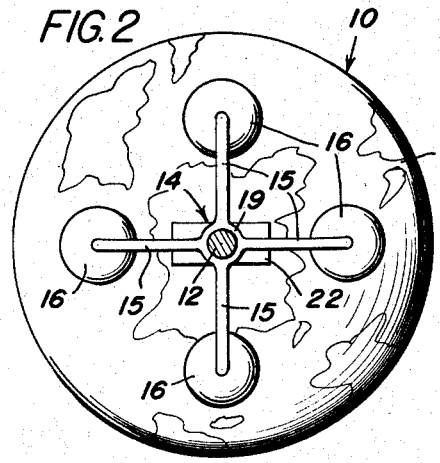
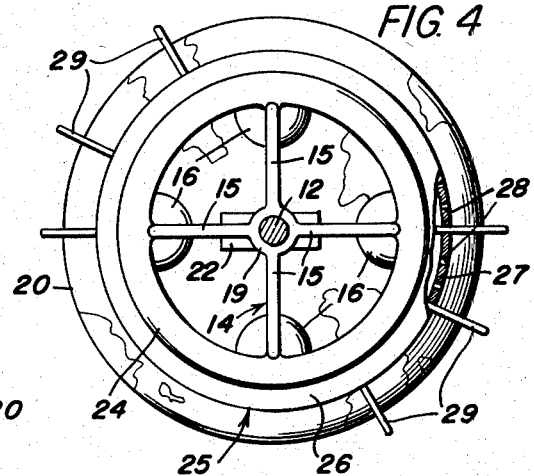
INVENTOR.
MAURITZ E. PETERSEN
BY *Victor J. Evans & Co.*
ATTORNEYS

United States Patent Office 2,896,338
Patented July 28, 1959

2,896,338

SATELLITE GLOBE

Mauritz E. Petersen, North Muskegon, Mich.

Application April 8, 1958, Serial No. 727,154

1 Claim. (Cl. 35—46)

This invention relates to a globe, and more particularly to a globe which can be moved so as to cause the globe to occupy different positions.

The object of the invention is to provide a globe which can be readily set or moved by hand, and wherein after the globe has been moved to the desired position, the globe will remain immobile, the globe being especially suitable for use in studying the direction of a satellite, plane, boat or the like.

Another object of the invention is to provide a globe which is adapted to be used for providing recreation or amusement to the users, and wherein the globe will also serve as an educational or scientific device since it is especially suitable for use in illustrating or tracking the path or movement of the various bodies such as satellites which orbit around the earth.

A further object of the invention is to provide a satellite globe which is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view of the satellite globe, constructed in accordance with the present invention, and with parts broken away and in section.

Figure 2 is a sectional view taken on the line 2—2 of Figure 1.

Figure 3 is a fragmentary elevational view illustrating a modification, and with parts broken away and in section.

Figure 4 is a sectional view taken on the line 4—4 of Figure 3.

Referring in detail to the drawings, and more particularly to Figures 1 and 2 of the drawings, the numeral 10 indicates the device of the present invention which includes a base 11 which has a post or standard 12 extending upwardly therefrom. A finger 13 projects upwardly from the post 12, and the numeral 14 indicates a supporting unit which includes a central bushing 19 that is mounted on the finger 13. The supporting unit 14 further includes a plurality of spaced apart arms 15 which extend upwardly from the bushing 19, and a cup shaped member 16 is connected to the upper end of each of the arms 15.

As shown in the drawings, a plurality of ball bearings 17 are supported in each member 16, and a ball piece or ball 18 engages the ball bearings 17, there being one of the ball pieces 18 supported by each cup shaped member 16.

The numeral 20 indicates a movable globe which has indicia thereon such as indicia or markings representing the continents or countries as well as the usual bodies of water that make up the globe or earth, and the globe 20 is hollow and has a ball member 21 arranged therein. A magnet 22 is secured to the finger 13 in any suitable manner, as for example by means of a securing element 23, and the ball member 21 and magnet 22 coact to help maintain the globe 20 immobile in its various adjusted positions. In other words, when a person desires to shift the globe 20 or move it to a different location, the globe 20 can be readily moved or rotated on the ball pieces 18 and this movement can be brought about by simply applying sufficient manual pressure to overcome the magnetic attraction between the ball member 21 and magnet 22. Then, when the globe 20 is released, the magnetic pull or attraction between the magnet 22 and ball member 21 will retain the globe 20 immobile in its adjusted positions. The provision of the ball bearing 17 and ball pieces 18 insure that the globe 20 can be readily rotated or moved from place to place as desired.

Referring now to Figures 3 and 4 of the drawings, there is illustrated a modification wherein the numeral 24 indicates a ring which surrounds the arms 15 and which is secured to the arms 15 in any suitable manner as for example by welding. The numeral 25 indicates a rotary or movable body member which includes a lower horizontally disposed flange 26 that is arranged above the ring 24. The body member 25 further includes a cylindrical collar 27 which is provided with a plurality of spaced apart apertures or openings 28 in the upper portion thereof. The numeral 29 indicates guide members or spring wires which have their lower portions engaging the apertures 28, and these guide members 29 are adapted to be used for indicating the direction of travel of satellites, missiles or the like and the guide members can be set or arranged so as to provide an indication of the orbital path of such flying objects or traveling objects.

From the foregoing, it is apparent that there has been provided a globe device which is not only highly educational and informative, but will also provide amusement and recreation for the users. It is to be noted that with the parts arranged as shown in Figures 1 and 2 for example, it will be seen that the globe 20 can be readily moved so that the globe can be positioned at any desired location whereby all parts of the globe are readily visible and observable, and after the globe has been moved to its desired location, the magnetic attraction between the member 21 and magnet 22 will retain the globe 20 stationary in its adjusted positions. The provision of the plurality of ball bearings 17 as well as the ball pieces 18 insures that the globe 20 can be readily shifted from place to place and wherein there will be a minimum amount of friction.

In the modification of Figures 3 and 4, the body member 25 is rotatably supported above the ring 24, and the guide members 29 have their lower ends arranged in engagement with the openings 28 in the collar 27. This permits the members 29 to be readily shifted to different locations, so that these members 29 can be used for any desired purpose, as for example these members can be used to indicate the orbital path of missiles or satellites which travel around the earth. Thus, the device can be used in different manners for educational as well as scientific and recreational purposes.

The parts can be made of any suitable material and in different shapes or sizes.

The number of wires or guide members 29 that are used can be varied as desired, and these members 29 can be used for illustrating or showing various routes of travel of satellites, planes, missiles or the like. Furthermore, the magnet 22 may be of the doughnut type instead of having a U-shape.

Heretofore globes of customary design have been set or held by a shaft which usually runs from pole to pole so that such globes had to be observed in their natural fixed position, but the globe of the present invention can be moved or rotated in any direction so that any part of the globe can be conveniently studied. Thus, the globe is extremely convenient to use, and the globe can be used for studying the direction of travel of a satellite, plane, boat, or the like.

The magnet is of a size or strength which is strong enough to hold the globe in position due to the attraction of the magnet on the iron ball 21 inside the globe. The magnetic effect may be provided by means of a permanent magnet, and where larger or heavier globes are used, they can be safely held in position by means of an electromagnet.

The ball pieces 18 may be made of plastic and facilitate the rotation or movement of the globe 20. These ball pieces 18 as well as the ball bearings 17 are held in the cup shaped members 16.

The body member 25 is rotatable, and serves to hold the spring wires 29. The members or wires 29 can be made in different colors to indicate different routes or directions at the same time. Furthermore, instead of using the iron ball 21 within the sphere 20, mercury can be used. In tracing like routes, soft iron wire could be used in place of the spring wire 29.

Minor changes in shape, size and rearrangement of details coming within the field of invention claimed may be resorted to in actual practice, if desired.

I claim:

In a device of the character described, a base, a post extending upwardly from said base, a finger extending upwardly from said post, a support unit including a central bushing connected to said finger, a plurality of spaced apart arms extending upwardly and outwardly from said bushing, cup shaped members on the upper ends of said arms, ball bearings arranged in said cup shaped members, ball pieces seated in said cup shaped members and engaging said ball bearings, a magnet secured to the upper end of said finger, a globe having indicia thereon movably supported on said ball pieces, a ball member arranged in said globe for coaction with said magnet, a ring surrounding said arms and secured thereto, a rotary body member including a lower flange arranged above said ring, said body member further including a cylindrical collar extending upwardly from said flange, there being a plurality of spaced apart apertures in the upper portion of said collar, and guide members arranged adjacent the outer periphery of the globe, said guide members having their lower end portions engaging said apertures.

References Cited in the file of this patent

UNITED STATES PATENTS

| 962,069 | Walters et al. | June 21, 1910 |
| 2,399,902 | Wood | May 7, 1946 |

FOREIGN PATENTS

| 808,938 | France | Nov. 24, 1936 |
| 1,004,206 | France | Nov. 28, 1951 |
| 253,974 | Switzerland | Apr. 15, 1948 |